June 6, 1961     T. E. SPENCE ET AL     2,986,802
ANTI-FRICTION BEARING FABRICATION
Filed Dec. 31, 1957     4 Sheets-Sheet 1

INVENTORS:
Thomas E. Spence a
Attilio R. Spicacci,
BY Paul & Paul
ATTORNEYS.

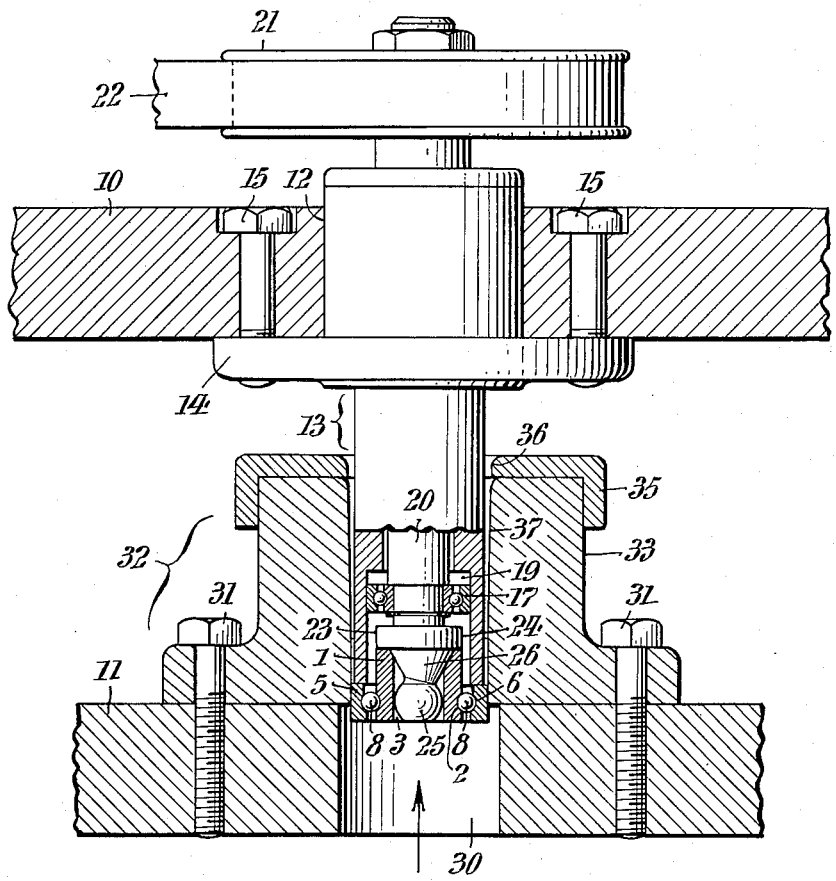
FIG_2_
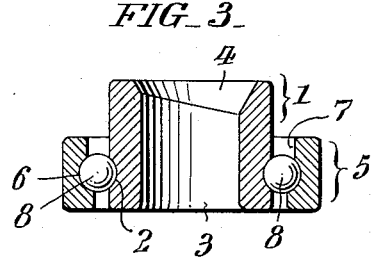
FIG_3_
INVENTORS:
Thomas E. Spence &
Attilio R. Spicacci,
BY Paul & Paul
ATTORNEYS.

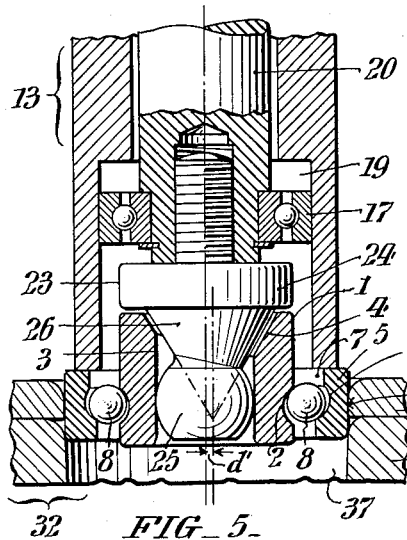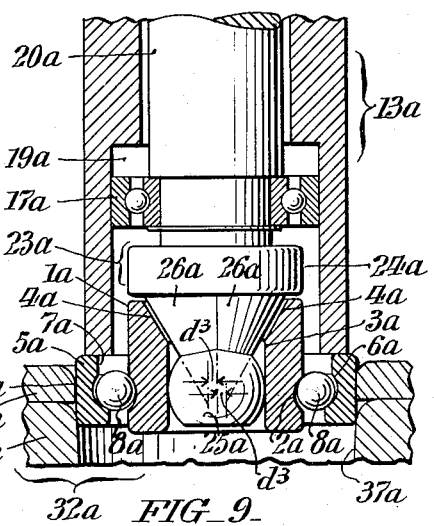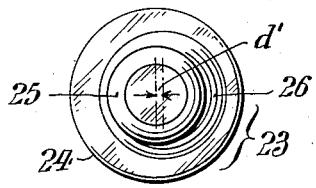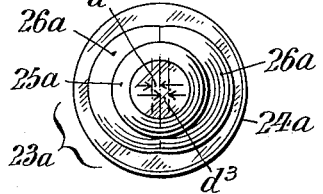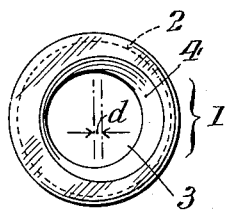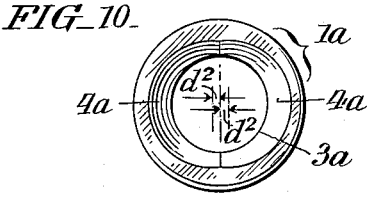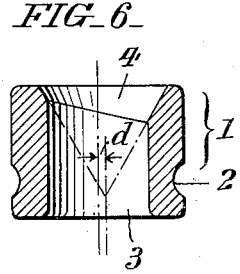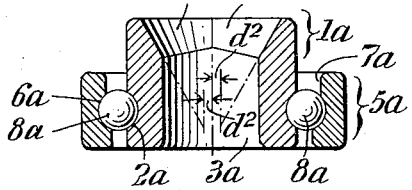

June 6, 1961 T. E. SPENCE ET AL 2,986,802
ANTI-FRICTION BEARING FABRICATION
Filed Dec. 31, 1957 4 Sheets-Sheet 4

INVENTORS:
Thomas E. Spence &
Attilio R. Spicacci,
BY
Paul & Paul
ATTORNEYS.

United States Patent Office 2,986,802
Patented June 6, 1961

2,986,802
ANTI-FRICTION BEARING FABRICATION
Thomas E. Spence, Wayne, and Attilio R. Spicacci, Lancaster, Pa., assignors to Channing Corporation, New York, N.Y., a corporation of California
Filed Dec. 31, 1957, Ser. No. 706,400
4 Claims. (Cl. 29—148.4)

This invention relates to the fabrication of anti-friction bearings i.e., bearings of the type in which a ring of rolling elements are disposed between inner and outer race components respectively having external and internal grooves cross sectionally conformative with the rolling elements.

The chief aims of our invention are to provide a simple method whereby bearings of the kind referred to can be fabricated economically and expeditiously with the grooves of the inner and outer race components smoothly and accurately conformed to the curvature of the rolling elements; and also to provide a simple and reliable apparatus suitable for the practice of such method.

As herein more fully disclosed, the inner race components of the bearings are produced, according to our invention, with peripheral grooves of which the cross section is substantially conformative with the rolling elements, and the outer race components are produced over size, from the standpoint of diameter, with internal grooves of which the cross section approximates the configuration of the rolling elements, so that upon placement of the inner components within the outer components, complements of the rolling elements can be inserted between them. With the parts so assembled and held, these assemblages are bodily thrust through a die having a tapered hole whereby the outer race components are circumferentially contracted to close in upon the rolling elements, one of the race components being rotated all the while relative to the other, with consequent smoothing of their grooves by the incidental rolling action of said elements.

Other objects and attendant advantages will appear from the following detailed description of the attached drawings, wherein:

FIG. 2 is a view, generally similar to FIG. 1, drawn to a larger scale and showing how the outer race component of the bearing is circumferentially contracted in the apparatus.

FIG. 3 shows, in axial section on a still larger scale, a completed bearing after having been operated upon in the apparatus.

FIG. 4 is a fragmentary view, in vertical section and in turn drawn to an enlarged scale, showing an intermediate stage in the operation of the apparatus.

FIG. 5 shows, in bottom plan, the drive element by which the inner race component of the bearing is rotated during circumferential contraction of the outer race component in accordance with my improved method.

FIG. 6 is an axial section of the inner race component of a bearing as initially formed.

FIG. 7 shows the top plan of the component of FIG. 6.

FIGS. 8 and 9 are views respectively similar to FIGS. 4 and 5 of a modified form of apparatus.

FIG. 10 is a view similar to FIG. 7 showing, in top plan, of the inner race component of a ball bearing as initially prepared for operation thereupon in the apparatus of FIGS. 8 and 9.

FIG. 11 shows, in axial section, a completed bearing as formed in the apparatus of FIGS. 8 and 9.

Figure 1:
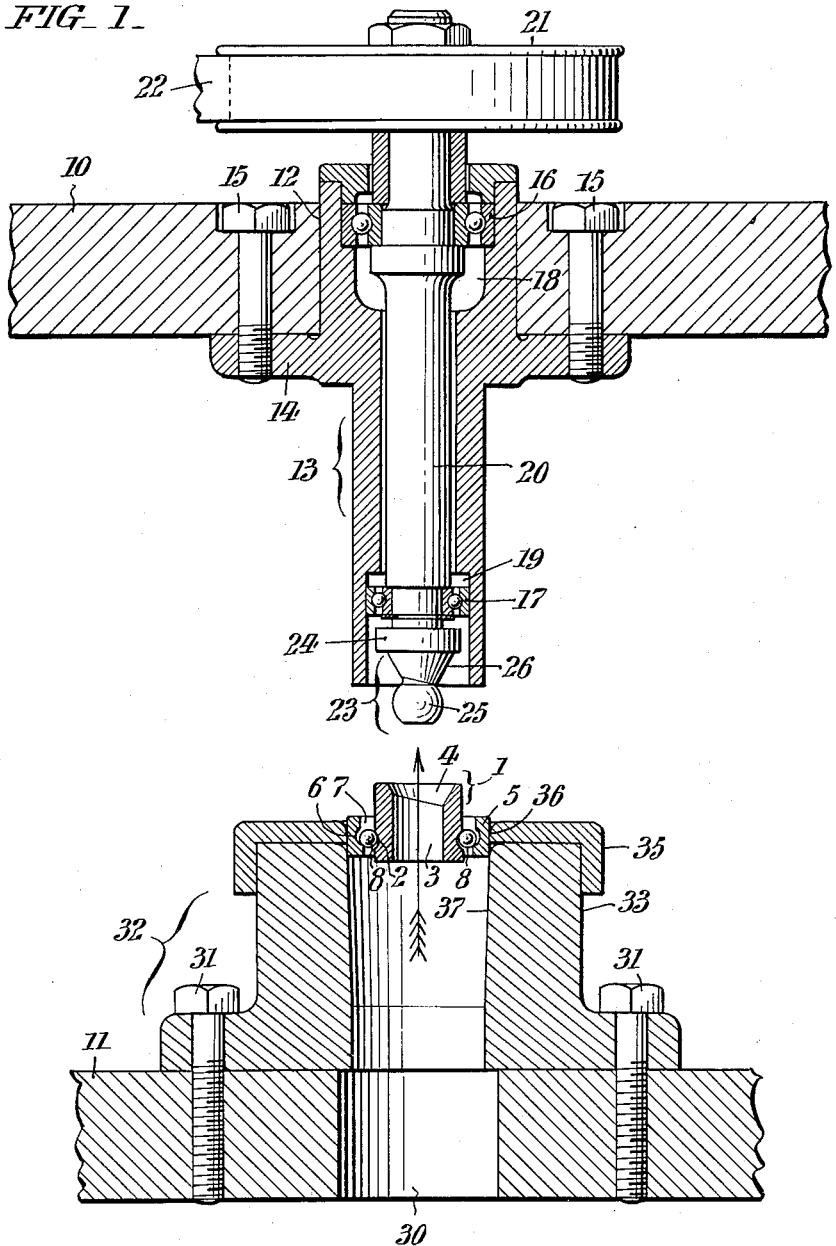
FIG. 1 is a view, in vertical section, of an apparatus adapted for carrying out in part our new method, with an anti-friction bearing assemblage in place therein in readiness to be operated upon for circumferential contraction of its outer race component about the rolling elements.

In the fabrication of anti-friction ball bearings in accordance with our invention, the annular inner race component 1 (FIGS. 6 and 7) of each such bearing is initially formed to size from ductile material which may be steel, with a peripheral groove 2 substantially semicircular in cross section and rounded to correspond substantially to the curvature of the balls, and with an axial bore 3 which, in this instance, is conically counter bored at one end as at 4, the axis of the counter bore being slightly eccentric by a $d$ from the main axis of the component. It is to be noted that the slope pitch of the counter bore 4 is made quite steep for a reason later explained. The annular outer race component see FIG. 4 of the bearing, on the other hand, is made oversize in diameter initially from like material with an internal groove 6 rounded in cross section on a curvature approximating that of the balls. As shown, the diameter of the opening in the outer race 5 component is larger at the upper end 7 than at the lower end with consequent provision of a relatively wide bottom ledge for the groove so that when the inner race component 1 is inserted into the outer race component 5 as in FIG. 4, there is afforded an interval sufficiently wide to enable introduction of a complement of balls 8 incident to assembling the bearing parts, with the balls resting on the bottom ledge of the raceway of the outer component and the inner component resting on the balls.

With reference now to FIGS. 1–4, the apparatus which we have devised for operation upon bearings loosely assembled as in FIG. 4, is in the form of a press having an upper ram member 10 and a lower ram member 11 which latter, in this case, is movable up and down relative to the upper ram member by means for example of a hydraulic cylinder (not illustrated), although if desired or found more expedient, this relationship may be reversed. The upper ram member 10 is apertured as at 12 to receive the diametrically enlarged upper end of a sleeve 13 which, as will be presently seen, serves as a plunger and of which the flange 14 is made fast to the ram member by means of screw bolts 15. Rotative in bearings 16 and 17 lodged in hollows 18 and 19 respectively at the top and bottom of the sleeve 13 is a spindle 20 whereto is secured, at the upper protruding end, a fly wheel pulley 21 arranged to be rotated by a belt 22 from a prime mover such as an electric motor (not illustrated) at a high speed. Screwed into the bottom end of the spindle 20 is a drive element 23 (so named for a reason which will become apparent later) having, below a concentric flange 24, a concentric spherical head 25 with an intervening downwardly tapering conical portion 26 of which the axis is slightly eccentric to the axis of the spindle by a distance $d'$ (FIG. 4) corresponding to the distance $d$ in FIGS. 6, 7 by which the coned counter bore 4 of the inner race component 1 of the bearing is eccentrically offset. The lower ram member 11 of the apparatus is provided with an opening 30, and mounted upon it and rigidly secured thereto, by screw bolts 31, is a die block 32 having an upwardly-projecting cylindrical boss 33 over which a flanged cap plate 35 is fitted. The aperture 36 in the cap plate 35 is of a diameter to snugly receive the outer race component 5 of a bearing as best seen in FIG. 4, and the hole 37 in the die block tapers downwardly from a diameter at the top equal to that of the aperture in said cap plate to a diameter at the bottom to which the outer race component 5 of the bearing is to be circumferentially contracted. As shown, the aperture 36 in the cap disk 35, the hole 37 in the die block 33 and the aperture 31 in the ram member 11 are all coaxial with the plunger sleeve 13 and the spindle 20, and the diameter of the lower portion of said sleeve is slightly less than the bottom end diameter of the hole in the die block.

*Operation*

After assembling the bearing in the manner hereinbefore described, it is placed in the apparatus as shown in FIG. 1, i.e., set into the opening 36 of the cap plate 35 with the outer race component rested within the upper end of the hole 37 in the die block 32. The ram member 11 is thereupon raised incident to which the spherical head 25 of the drive element 23 is first entered into the axial bore 3 of the inner race component 1 of the bearing. Upon further rise of the ram member 11, the off-center coned portion 26 of the drive element 23 on the spindle 20 is eventually entered into the coned counter bore 4 of the inner race component 1, when, at the same time the inner race component is engaged by the flange 24 of said extension and the outer race component 5 is engaged with the bottom end of the plunger sleeve 13 as in FIG. 4. During further rise of the ram to the limit of its upward movement, the inner component 1 of the bearing is constantly rotated with the spindle 20 due to the coupling action of the eccentric cone portion 26 of the drive element 23 with the eccentric coned counter bore 4 in said component, while the outer race component 5 of the bearing is gradually contracted circumferentially by the reducing taper of the hole 57 in the die block 32 as in FIG. 2, the completed bearing finally dropping through the larger aperture 30 in the ram plate. Due to rotation of the inner race component by the spindle 20 during this operation, it will be seen that the curvature of the groove 2 in said component, and the groove 6 in the outer race component are smoothed by attendant rolling action of the balls, the groove of the inner component being gradually brought into the plane of the groove in the outer component and the completed bearing appearing as illustrated in FIG. 3. It is to be understood that in practice, the extent to which the outer race component is circumferentially contracted is so controlled as to assure smooth rolling contact of the balls without binding of the balls in the grooves of the two components. Attention is directed here to the fact that easy connection and disconnection of the inner race component with and from the drive element 23 of the spindle 20 is assured by the liberal slope of the complementally coned surface of the counter bore of said component and of said drive element. Jamming of the apparatus is thus effectively precluded. Our method can be referred most accurately to the "line of contact" concept. The "line of contact" in ball bearing usage is an imaginary line through the ball established at one end by the ball contact with the inner raceway and at its other end by the ball contact with the outer raceway. In any ball bearing the "line of contact" may be related to the axis line of the bearing. For example, a "line of contact" may be at 60° to the axis line and in this case the bearing would usually be termed as "angular contact" bearing. If the "line of contact" establishes a line 5° or 10° from the perpendicular line to the axis line, the bearing is commonly called a "radial" bearing. These are widely used terms describing bearing types in the bearing industry. Our loose bearing assembly is essentially an exaggerated "angular contact" bearing. The fact that the balls rest on outer race internal raceway ledge, supported from below, and in turn support the inner race above, establishes a "line of contact" angle with the axis line of relatively low value—say 45°. As we close the outer race in on the balls, the balls are forced upward along the raceway ledge so that the "line of contact" changes position and moves toward the line perpendicular to the axis line—or toward the "radial" form of bearing. When we have contracted sufficiently so that all the balls are in direct radial contact, our rotating inner race functions to smooth out the grooves by the rolling action of the balls. The function of eccentric motion imparted to the inner race is to permit us to contract to a lesser extent leaving what would be an "angular contact" bearing with radial clearances within the bearing—but by the eccentric motion we force a portion of the balls, at any one time during rotation, to the bottom of the raceways thereby getting the smoothing action without having them all retained close to the raceway bottoms as in a "radial" bearing.

As an alternative, the inner race component of each bearing may be counter bored on two axes as 4a, 4a in FIGS. 10 and 11 equally spaced from the main axes of the component by equal distances $d^2$. For operation upon an inner race component 1a so characterized, the coned portion of the drive element 23a of the spindle 29a is here correspondingly formed with two conical lobes with axes spaced by corresponding distances $d^3$ from the axis of said spindle, the completed bearing, after being discharged from the modified apparatus appearing in cross section as shown in FIG. 11. In order to dispense with the necessity for repetitive description all other elements of the modified apparatus not particularly referred to, but having their counterparts in the first described embodiment, are identified by the same reference numerals previously employed, with addition however in each instance of the letter "a" for convenience of more ready distinction.

Figure 12:
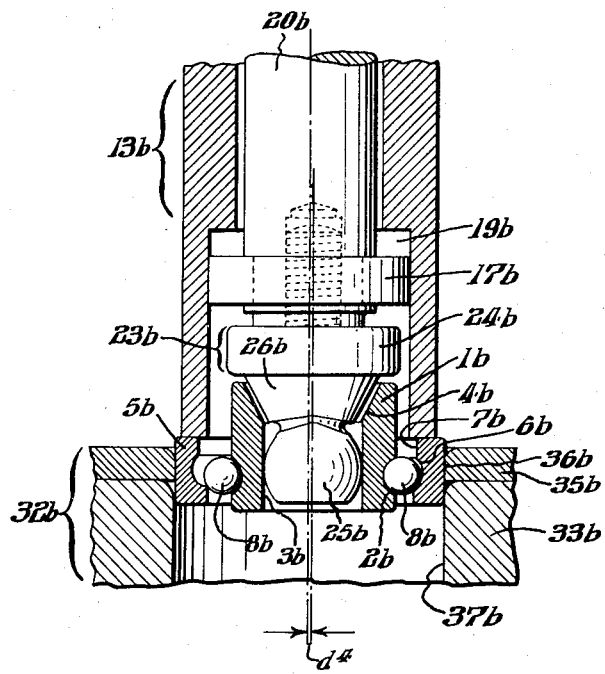
FIG. 12 is a fragmentary view in section, in turn similar to FIGS. 4 and 5, of another modified form of the invention.

In the second modified embodiment illustrated in FIG. 12, the common axis of the flange 24b, the spherical head 25b and the intermediate double lobed conical portion of the drive element of the spindle 20b is eccentrically offset by a distance $d^4$ from the axis of the spindle 20b, the remaining elements of the structure, not particularly referred to but having their counterparts in the first described embodiment being here likewise identified by the same reference numerals previously employed but with addition in each instance of the letter b. In this last modification, it will be seen that, during, the circumferential contraction of the outer race component 5b, the inner race component 1b is gyrated bodily within said outer component, at the same time rotated about its own axis, and it is to be expressly understood that, in actual practice, the eccentricity at $d^4$ is made very small, i.e., to correspond merely with the extent of the working clearance desired between the balls and the raceways in the completed bearing. It is to be further understood that in practice, the extent to which the outer race is contracted is so controlled as to assure rolling contact and attendant smoothing of the grooves at the predetermined working clearance corresponding to the eccentricity $d^4$.

After completion of bearings in the manner herein disclosed, they may be heat treated. While, for the purpose of exemplification, we have described our invention in connection with the fabrication of ball bearings, it is not to be considered as so limited since, as will be apparent to those skilled in the art, it can be used with advantages equal in all respects to those hereinbefore pointed out in the production of anti-friction bearings of the roller type. The broader of the appended claims are therefore to be construed with this in mind.

Having thus described our invention, we claim:

1. A method of fabricating a ball bearing comprising the steps of forming an inner race component with an external ball raceway; forming an oversize outer race component with an internal ball raceway, the opening above said raceway being larger than the opening below said raceway, the surface of said raceway being continuous from the intersection with the opening above to the intersection with the opening below to provide a ball supporting raceway ledge; inserting the inner race component into the outer race component and introducing the balls from above into the annular interval between the two raceways so that the outer race component supports the balls on its raceway ledge and the balls support the inner race component by contact on the inner race component raceway; and finally contracting the outer race component while imparting rotary movement to the inner race component on a center line coinciding with the center line of the outer race component, said contraction causing the opposed ball raceway contact points to move toward radial alignment, and said rotation imparting a raceway smoothing rolling action to the balls when the ball raceway contact points are radially aligned.

2. The method according to claim 1, wherein the inner race component is rotated as the outer race component is contracted incident to being forced through a tapering hole in a die block.

3. The method according to claim 1, wherein the rotary movement imparted to the inner race component causes the center line of the inner race component to move around the center line of the outer race component.

4. The method according to claim 3, wherein the inner race component is rotated as the outer race is contracted incident to being forced through a tapering hole in a die block.

References Cited in the file of this patent
UNITED STATES PATENTS

| | | |
|---|---|---|
| 1,080,169 | Reed | Dec. 2, 1913 |
| 1,437,431 | Lonbom | Dec. 5, 1922 |
| 2,255,626 | Ortegren | Sept. 9, 1941 |
| 2,783,528 | Menne | Mar. 5, 1957 |